(12) United States Patent
Pado

(10) Patent No.: US 7,447,664 B2
(45) Date of Patent: Nov. 4, 2008

(54) NEURAL NETWORK PREDICTIVE CONTROL COST FUNCTION DESIGNER

(76) Inventor: Lawrence E. Pado, 3702 Banbury Dr., St. Charles, MO (US) 63303

( * ) Notice: Subject to any disclaimer, the term of this patent is extended or adjusted under 35 U.S.C. 154(b) by 824 days.

(21) Appl. No.: 10/653,010

(22) Filed: Aug. 28, 2003

(65) Prior Publication Data
US 2005/0049728 A1    Mar. 3, 2005

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ............... 706/15; 706/19; 706/906
(58) Field of Classification Search ........... 706/15, 706/19, 906; 700/7
See application file for complete search history.

(56) References Cited

U.S. PATENT DOCUMENTS

| | | | | |
|---|---|---|---|---|
| 5,268,834 | A * | 12/1993 | Sanner et al. | 700/31 |
| 6,081,750 | A * | 6/2000 | Hoffberg et al. | 700/17 |
| 6,185,470 | B1 | 2/2001 | Pado et al. | |
| 6,373,033 | B1 * | 4/2002 | de Waard et al. | 219/497 |
| 6,445,963 | B1 * | 9/2002 | Blevins et al. | 700/44 |
| 6,643,569 | B2 * | 11/2003 | Miller et al. | 701/29 |
| 7,142,990 | B2 * | 11/2006 | Bouse et al. | 702/35 |
| 2001/0044789 | A1 * | 11/2001 | Widrow et al. | 706/14 |

OTHER PUBLICATIONS

Pado, L.E., and Damle, R.R., "Predictive Neuro Control of Vibration in Smart Structures," Proceedings of the SPIE 1996 Symposium on Smart Structures and Materials, 1996, 9 pgs., San Diego, CA.
Lichtenwalner, P.F., Little, G.R., Pado, L.E., and Scott, R.C., "Adaptive Neural Control for Active Flutter Suppression," Proceedings of the ASME Fluids Engineering Division ASME, Nov. 1996, 6 pgs., FED-vol. 242, Atlanta, GA.
Pado, L.E., Lichtenwalner, P.F., Liguore, S. L., Drouin, D., "Neural Predictive Control for Active Buffet Alleviation," Proceedings of the SPIE Symposium on Smart Structures and Materials, 1998, 12 pgs., vol. 3326, San Diego, CA.
Pado, L.E., and Lichtenwalner, P.F., "Neural Predictive Control for Active Buffet Alleviation," Proceedings of the 40th AIAA Structures, Structural Dynamics, and Materials Conference, Apr. 1999, pp. 1043-1053, Copyright © 1999 by The Boeing Company, Published by the American Institute of Aeronautics and Astronautics, Inc., St. Louis, MO.
Scott, R.C., "Active Control of Wind-Tunnel Model Aeroelastic Response Using Neural Networks," Journal of Guidance, Control, and Dynamics, Nov.-Dec. 2000, pp. 1100-1108, vol. 23, No. 6.

* cited by examiner

*Primary Examiner*—Joseph P Hirl

(57) ABSTRACT

A method, a computer-readable medium, and a system for tuning a cost function to control an operational plant are provided. A plurality of cost function parameters is selected. Predicted future states generated by the neural network model are selectively incorporated into the cost function, and an input weight is applied to a control input signal. A series of known signals are iteratively applied as control input inputs, and the cost output is calculated. A phase is taken of the control and plant outputs in response to each of the known signals and combined, thereby allowing effective combinations of the cost function parameters, the input weight, and the predicted future states to be identified.

14 Claims, 7 Drawing Sheets

NEURAL NETWORK PREDICTIVE CONTROL COST FUNCTION DESIGNER

FIELD OF THE INVENTION

This invention relates generally to control systems and, more specifically, to optimizing neural network control systems.

BACKGROUND OF THE INVENTION

U.S. Pat. No. 6,185,470 (the '470 patent) addressed a solution to a long-standing need. The '470 patent recognized that many dynamic, nonlinear systems exist which need adaptive forms of control. Just some of the problems arising were vibration and undesirable aeroelastic responses adversely affecting various flexible structures such as an aircraft wing. These adverse effects shortened the life spans and increased the acquisition and maintenance costs of such structures. The active control system presented by the '470 patent is useful for reducing vibration, alleviating buffet load and suppressing flutter of aircraft structures, providing adaptive hydraulic load control, reducing limit cycle oscillations of an aircraft store, and providing other solutions.

The nonlinear adaptive controller provided by the '470 patent is not system specific and learns nonlinearities in a neural network. Further, the controller has a relatively fast time constant of about one millisecond or faster and does not need to copy the actions of another controller which must first be developed. The nonlinear adaptive controller provided by the '470 patent provides these benefits through the use of a neural network adaptive controller which provides improved control performance over that of a conventional fixed gain controller.

FIG. 1A is a block diagram of a system 100 using such a control system 110. The control system 110 receives a control input 120. A control system output 130 is applied as a plant input to an operational plant 140 which in turn yields a plant output 150. An object of the control system 110 to control and stabilize the plant output 150 by applying an appropriate control output/plant input 130. An effective control output 130 is one that is both stable and has high gain.

More specifically, the neural network adaptive controller of the '470 patent uses online learning neural networks to implement an adaptive, self-optimizing controller for an operational plant. As shown in FIG. 1B, the method of the '470 patent creates a neural network model 160 that stores past system states 170 in response to past control inputs 180. Based on future control inputs 190, the neural network model yields predicted future states 195 of the operational plant (not shown).

As shown in FIG. 2, the '470 patent create a neural network controller 200 for controlling an operational plant 210. The neural network controller 200 includes a performance optimization index or cost function 220 which is a function of the future output states 140 of the neural network model 100. In the system using the neural network controller 200, a reference model 240 generates an output 230 which is received by the cost function 220 along with the future output states 140. A control output 250 of the cost function 220 helps to provide stable, effective control of the operational plant 210.

However, tuning the cost function can be a time-consuming and labor-intensive process. Tuning the cost function can require detailed and repetitive manipulations of the cost function parameters to achieve stable and effective control. Moreover, attempting to avoid these calculations by simply experimenting with various cost function parameters to test those parameters possibly can result in damage to the operational plant if the parameters do not yield stable controllers.

Thus, there is an unmet need in the art for an efficient and safe method by which to tune cost function parameters to effectively control an operational plant with a neural network adaptive controller.

SUMMARY OF THE INVENTION

Embodiments of the present invention provide a method, computer-readable medium, and system for tuning a cost function used by a neural network control system. Embodiments of the present invention allow a number of cost function parameters, predicted future states, and control input weights to be tested to determine desirable tuning parameters without tedious manual calculations or empirical testing that could damage an operational plant to be controlled by the neural network controller.

More specifically, embodiments of the present invention provide a method, a computer-readable medium, and a system for tuning a cost function to control an operational plant. A plurality of cost function parameters is selected. Predicted future states generated by the neural network model are selectively incorporated into the cost function, and a control input weight is applied to a control output signal. A series of known signals are iteratively applied as control input signals, and the control output is calculated. Phase information is calculated from both the (cost function based) control and plant outputs in response to an input chirp and combined, thereby allowing effective combinations of the cost function parameters, the control input weight, and the predicted future states to be identified.

In accordance with further aspects of the present invention, the method is repeated for a variety of control input weights and a plurality of combinations of predicted future states. Two predicted future states may be combined, or all the predicted future states may be assessed as weighted by a "forget factor." The phase between the control output and the control input signal is then measured and combined with a phase of the operational plant with respect to its input chirp at its modes to determine which of the combinations of variables result in stable controllers. The stable controllers are sorted in order of effectiveness and stored.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a method, a computer-readable medium, and a system for tuning a cost function to control an operational plant. A plurality of cost function parameters is selected. Predicted future states generated by the neural network model are selectively incorporated into the cost function, and a control input weight is applied to a control output signal. A series of known signals are iteratively applied as control input signals, and the cost is calculated. The phase between the control output and the control input signal is then measured and combined with a phase of the operational plant with respect to its chirp input signal at each mode of interest, thereby allowing effective combinations of the cost function parameters, the input weight, and the predicted future states to be identified.

In one non-limiting embodiment of the present invention, the cost function is a cost function suitably represented by the expression:

$$C = \sum_{i=1}^{n} \left( G_p \cdot Y_i^2 + G_v \cdot \dot{Y}_i^2 + G_I \cdot I^2 \right)$$

where C=cost of selected input (I), i through n represent a range of the predicted future states being evaluated, $G_p$=position gain, $Y_i$=predicted state of the plant at horizon i, $\dot{Y}_i$=predicted rate of change of the state of the plant at horizon i, $G_v$=velocity gain, and $G_I$=the model input. The cost function output C varies greatly as a result of the values selected for coefficients $G_p$, $G_v$, and $G_I$ as they are applied to the predicted, future output states of the neural network controller. In turn, the cost function output substantially determines the success of the neural network controller. Thus, determining appropriate values for these parameters determines the success of the controller. Advantageously, embodiments of the present invention determine appropriate values for these parameters in order to determine effective control outputs. An effective control output is one that is both stable and has high gain.

Figure 1A:
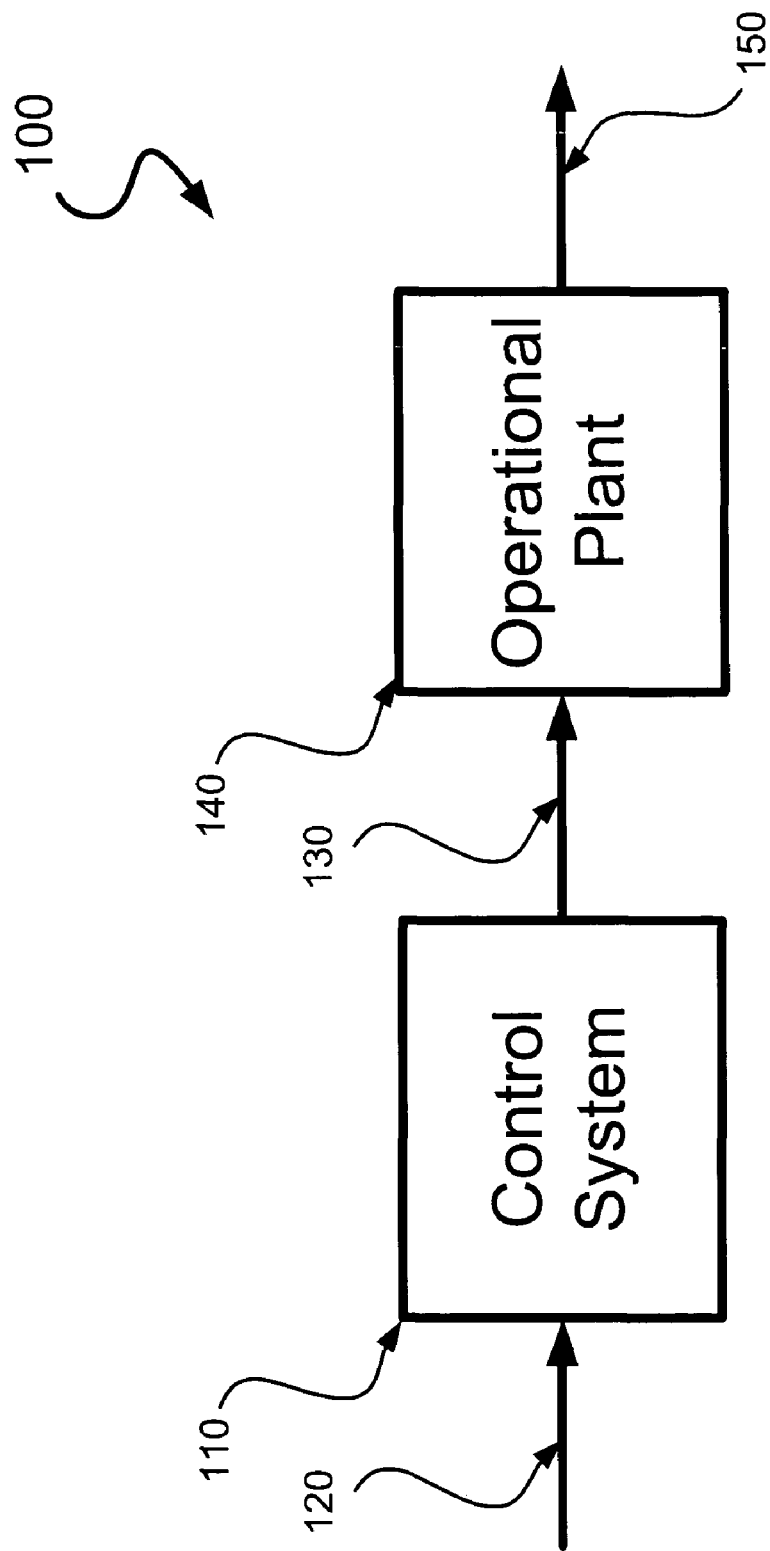
FIG. 1A is a block diagram of a system using an active control system.
Figure 1B:
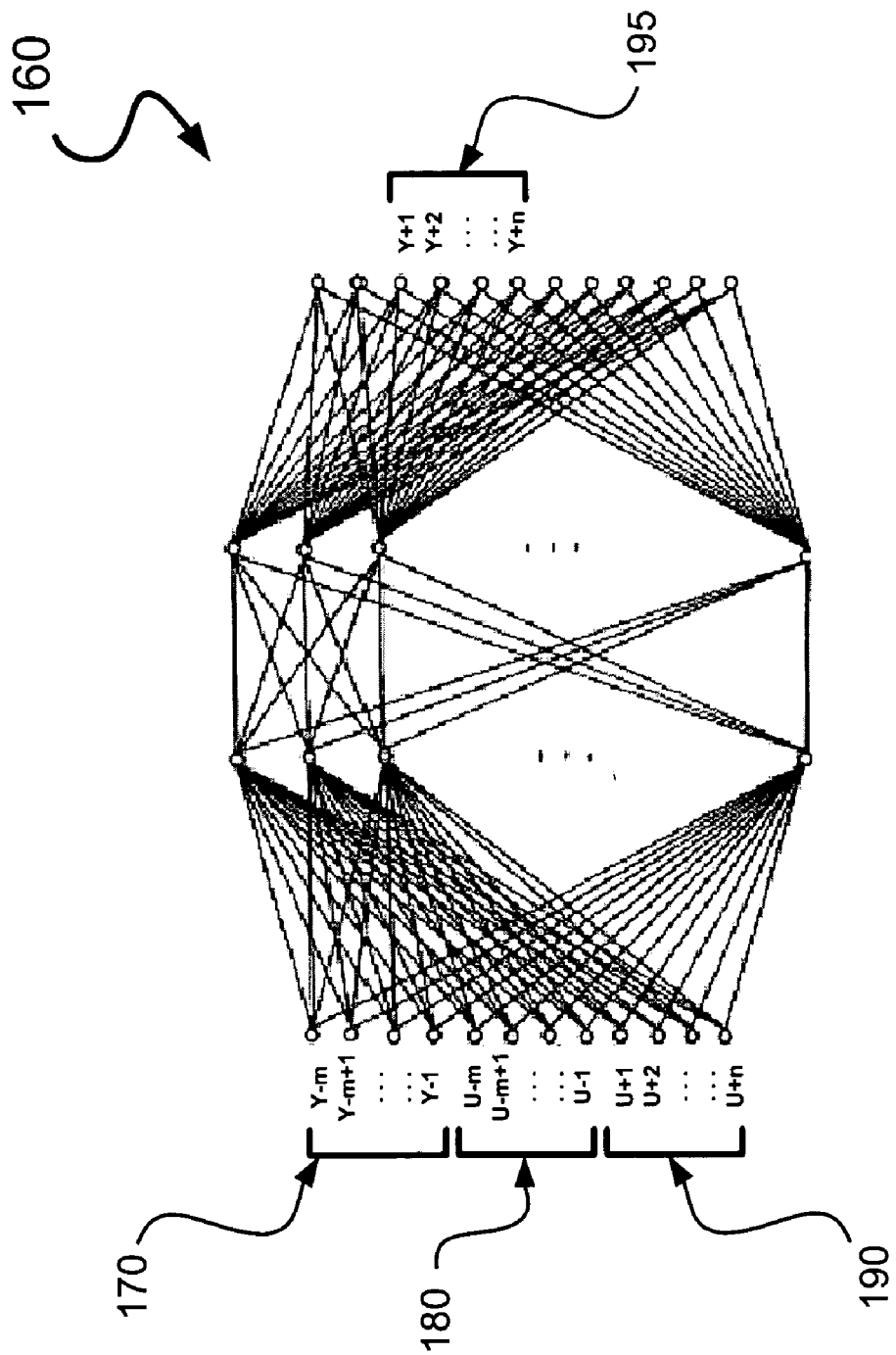
FIG. 1B is a depiction of a neural network model yielding a number of predicted future outputs as described in the prior art.
Figure 2:
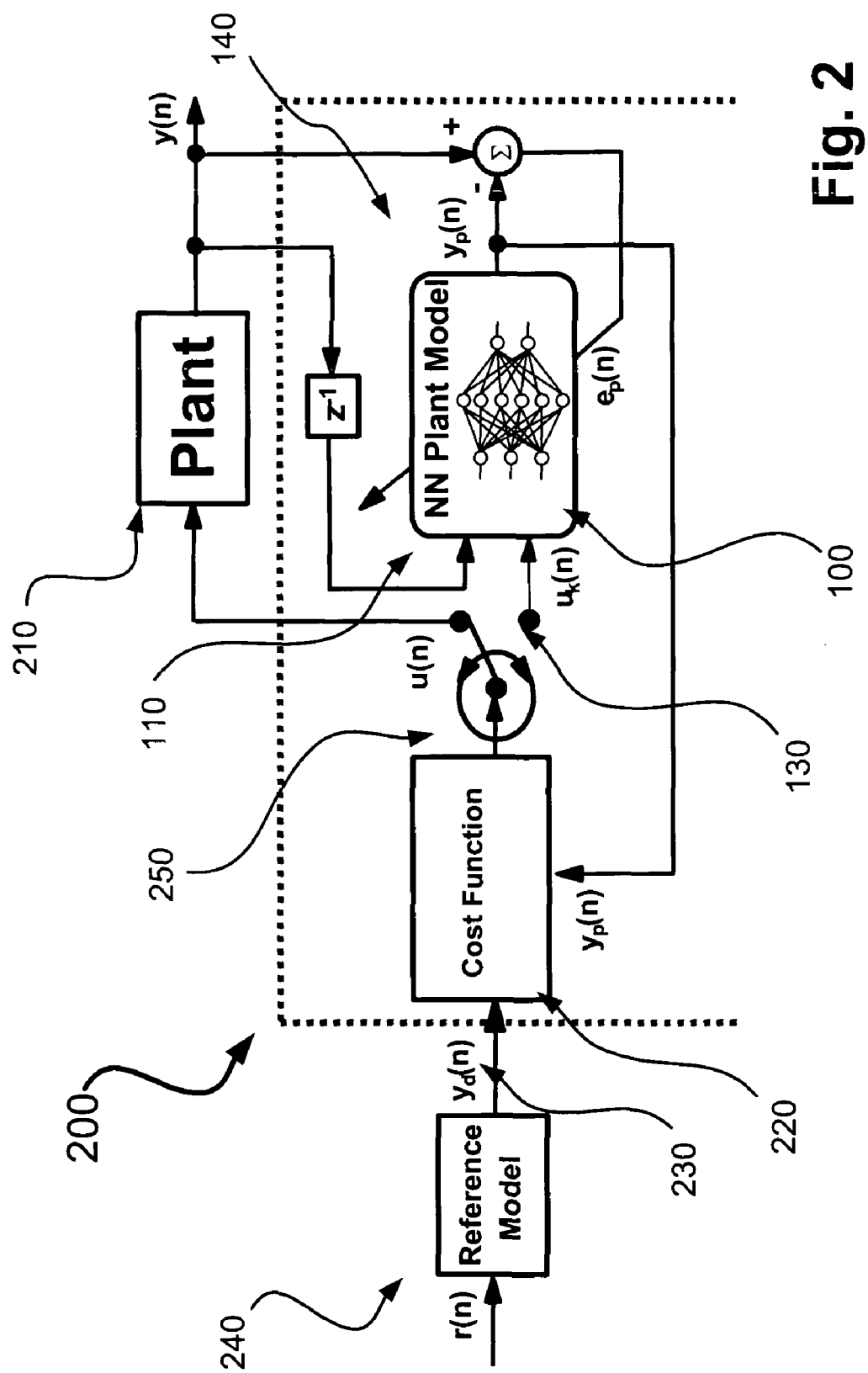
FIG. 2 is a block diagram of a neural network controller having a neural network model and a cost function as described in the prior art.
Figure 3:
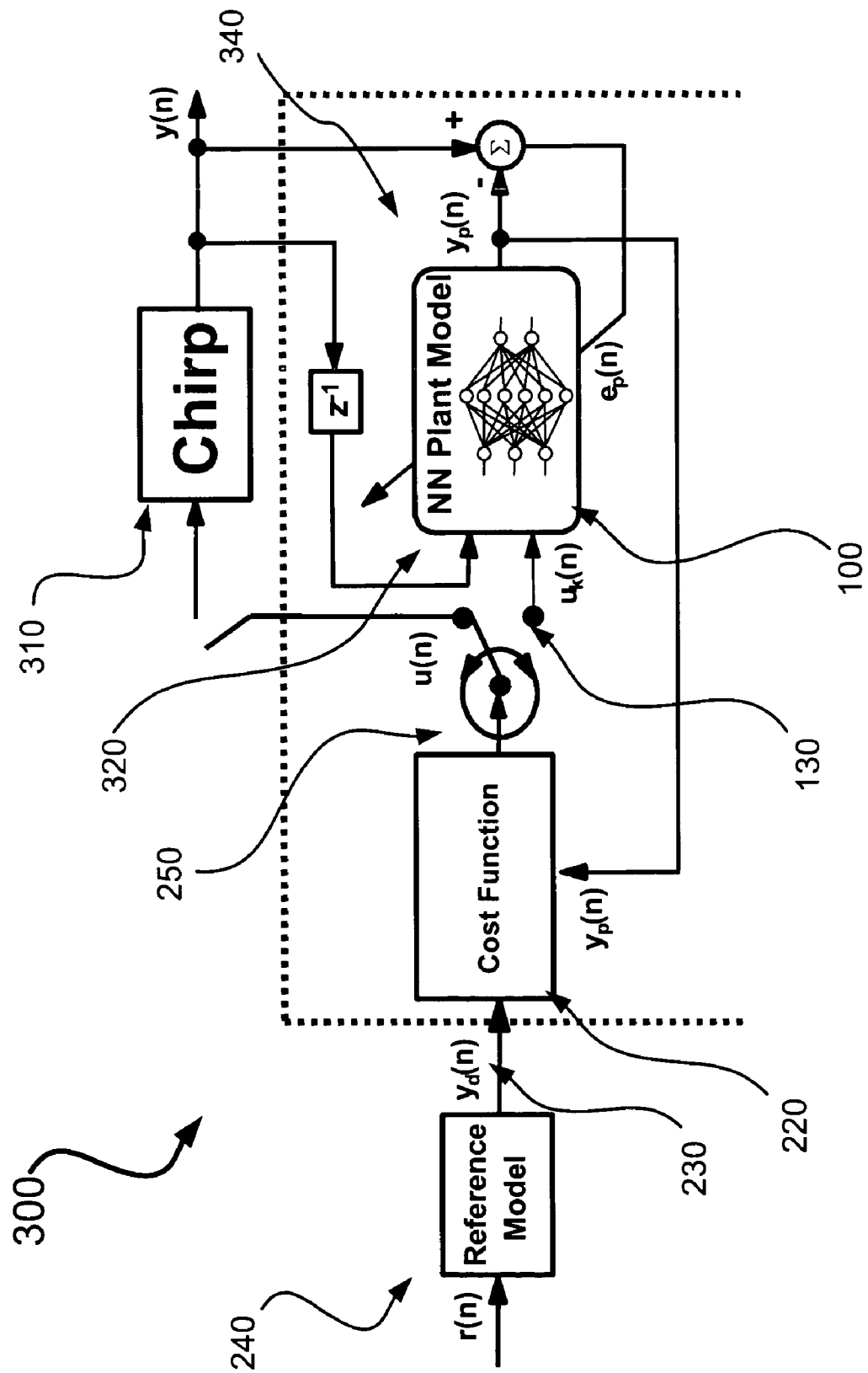
FIG. 3 is a block diagram of the neural network controller of FIG. 2 replacing an operational plant with a known signal source.

FIG. 3 shows a system 300 for tuning the cost function or performance index 220. As compared to FIG. 2, two changes will be appreciated. First, in the system 300 the operational plant 210 (FIG. 2) has been replaced by a software signal generator 310. The software signal generator 310 generates a chirped signal y(n) which is applied to the cost function 220 for evaluating the effectiveness of cost function 220 parameters. A chirp is defined as a sinusoidal wave which linearly increases in frequency over time. Second, in the system 300 a cost function output 250 is not connected to the signal generator 310 as the cost function output 250 was received by the operational plant 210. A focus of the system 300 is tuning the cost function 220, and use of the operational plant 210 is neither required nor desired in this tuning process so as to avoid possible wear or damage to the operational plant as previously described. Knowledge of the operational plant 210 (FIG. 2) is used to tune the cost function 220 parameters, but the operational plant 210 is not used in the tuning process, as will be described below.

Using the system 300 (FIG. 3), generally, two different processes for testing different permutations of cost function parameters suitably are used to determine viable parameters. A first process is termed AB looping in which the cost function is computed for combinations of two different future outputs of the neural network model. Taking two different future outputs and "chirping" the control system allows for evaluating the control output as a result of changing cost function parameters over a range of possible inputs. Selected cost function parameters are set. Then, for each of the pairs of future outputs for each chirp, a significant cost function parameter, such as input weight, is varied. Input weight is significant because, as will be appreciated by one ordinarily skilled in the art, the greater the input weight, the lower the control gain. Correspondingly, the lower the input weight, the greater the control gain. If the gain becomes too high, the control system becomes unstable.

A second process is termed "forget factor" looping in which all of the future outputs are used in evaluating the response of the cost function to the chirped signal. However, in forget factor looping, a forget factor weighting is applied to each of the future inputs to differently emphasize the future outputs.

Figure 4A:
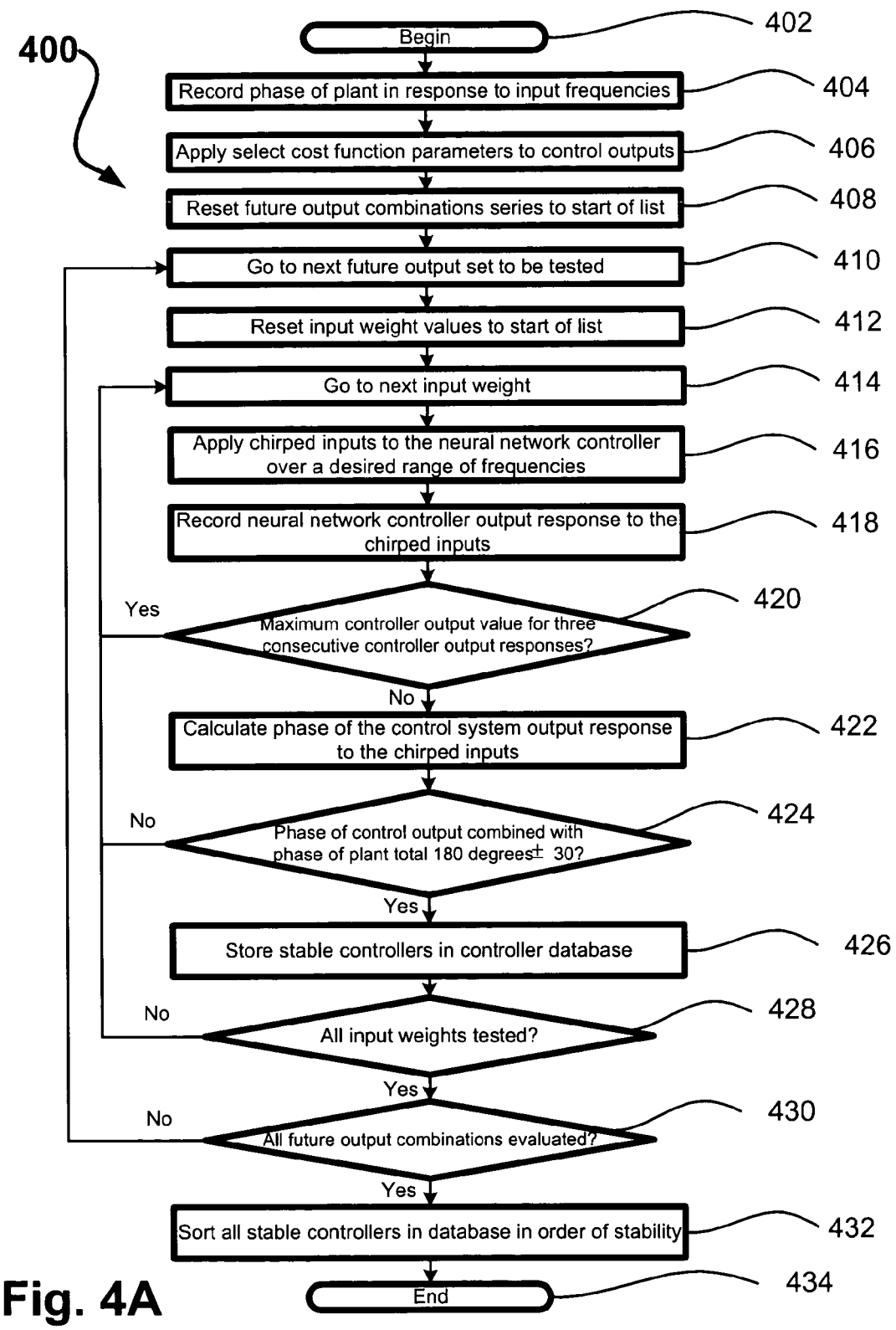
FIG. 4A is a flowchart of a routine according to an embodiment of the present invention.

FIG. 4 shows a routine 400 for employing the system 300 (FIG. 3) to tune the cost function 220 parameters using AB looping. The routine 400 begins at a block 402. At a block 404, in preparation for tuning the cost function 220 parameters, the phase of the operational plant at each mode in response to an input chirp is recorded. Such phase can be determined by applying a plant input chirp to the operational plant and computing a fast Fourier transform (FFT) of the response of the operational plant. In one hypothetical system, the plant input chirp may excite a plant resonance frequency at 10 Hz and 30 Hz. Taking a FFT of the response of the operational plant may produce a phase of 15.2 degrees at the 10 Hz mode and a phase of 12.4 degrees at the 30 Hz mode.

Knowing the phase response of the operational plant at its resonance frequencies (or modes), at a block 406 the program can be manually set up to choose what and how many controller instantiations to test and compare. The cost function parameters are $G_p$ and $G_v$ and the control input weight. $G_p$ and $G_v$ control the weighting in the cost function placed on minimizing the variance of the position and the velocity, respectively, of the operational plant. $G_p$ and $G_v$ suitably are varied between 0 and 1, thereby testing combinations $G_p$=1 and $G_v$=0, $G_p$=0 and $G_v$=1, and $G_p$=1 and $G_v$=1. By weighting the position and velocity variance of the system, these select parameters affect the phase of the cost function. In addition, the number of input weights to examine is set at this point.

At a block 408, the combination of future outputs is reset to an initial set of future outputs, for example, future output 1 and future output 1. More particularly, in an exemplary neural network model, there are 15 future outputs. Taking two future states, either future output can be future output 1 through future output 15. As a result, the number of possible combinations of future outputs in a system having 15 future outputs is 15 times 15 divided by 2, or 225. In one presently preferred embodiment of the present invention, taking combinations of two of the future outputs generated by the system and then measuring the controller's response to a chirp control input provides an effective measure of the effectiveness of the parameters and weights applied in tuning the cost function.

Once the combinations have been reset at the block 408, at a block 410 the next set of combinations of future outputs is tested, such as future output 1 and future output 2. At a block 412, the list of input weights to be applied to the controller system input signals is reset. For the routine 400 and the routine 500 (FIG. 5), it is assumed that 20 different input weights provides a sufficient range of possible input weights, although more or fewer input weights suitably are tested according to other embodiments of the present invention. At a block 414, a next input weight is selected to be applied to the controller system input signals. At a block 416, a series of chirped control inputs is applied to the neural network controllers. The chirped frequencies are the same as those that are applied to the operational plant at the block 404 to gauge the response of the operational plant to those signals. This is because it is the combined characteristics of the control system and the operational plant that will determine the overall response of the operating system to stimuli. At a block 418, responses of the neural network controller are recorded in response to the chirped control inputs applied at the block 416.

At a decision block 420, it is determined whether a maximum control output value results for three consecutive control output responses. The maximum control output value is the highest output of which the controller is capable in attempting to apply a corrective signal to the operational plant. If three maximum values in a row are recorded, it is indicative that the combination of parameters and input weights is not stable and the control system is overcorrecting the operational plant. If three maximum control output values are recorded in a row, the combination of parameters and input weight can be disregarded as unstable. Advantageously, further chirping of the control system may be avoided, thereby saving processing time that could be devoted to testing potentially viable combinations of control system parameters and input weights. If three consecutive control output signals reach the maximum value, the routine 400 loops to the block 414 to test the next input weight.

On the other hand, if at the decision block 420 the maximum control output value is not recorded for three consecutive control output responses, at a block 422 the phase of the control outputs is calculated. In one presently preferred embodiment, a FFT is used to calculate the phase of the control outputs, as well as to calculate the phase of the operational plant to the range of known signals applied to them.

Figure 4B:
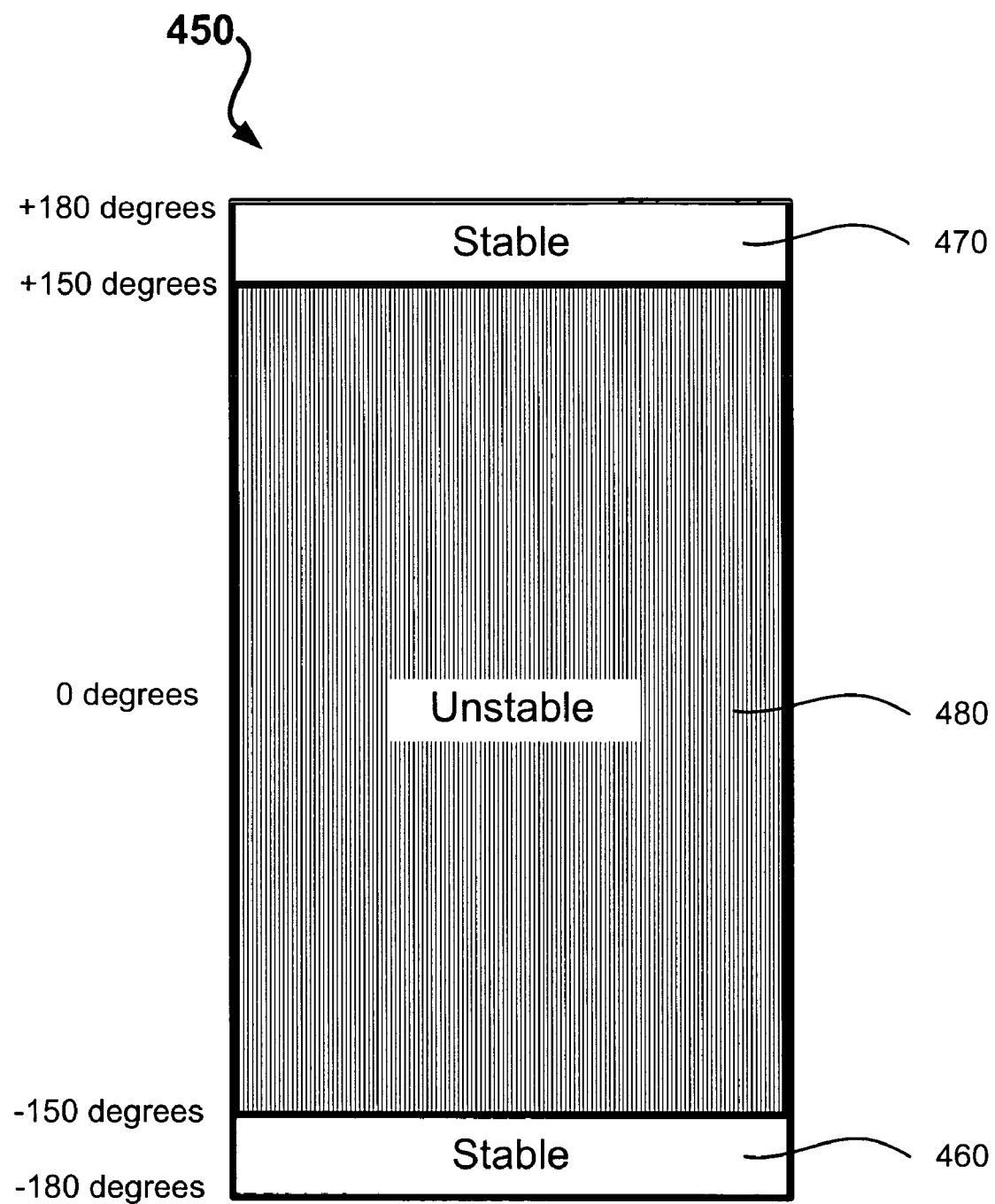
FIG. 4B shows a graph representing stable and unstable control solutions.

At a decision block 424, it is determined if the phase of the control output combined with the phase of the operational plant for the input signal indicates that the control parameters and input weights tested are stable. FIG. 4B shows a graph 450 representing stable and unstable control solutions. More specifically, the graph 450 charts on its vertical axis a sum of a phase differential between the plant input and plant output and a phase differential between a control input and a control output. It will be appreciated that, in an optimal control system, the control system will apply a control signal such that the combined phase differential of the control system and the operational plant is 180 degrees, indicating that the control system has oppositely countered the output of the operational plant. A combined output in a region 460 between −150 and −180 degrees or in a region 470 between +150 and +180 degrees is considered sufficiently stable. On the other hand, a shaded region 480 between −150 degrees and +150 degrees is regarded as not being sufficiently stable.

Accordingly, at the block 424 (FIG. 4A) if the sum of the phase differential between the plant input and plant output and the control input and control output is determined to be unstable, then the parameters and input weight are not considered stable, and the routine 400 loops to the block 414 to try the next input weight. On the other hand, if at the decision block 424 the sum of the phase differential between the plant input and plant output and the control input and control output is determined to be stable, then at a block 426 the combination of parameters and input weight is stored in a controller database.

At a decision block 428, it is determined if all the input weights have been tested. If not, the routine 400 loops to the block 414 to go to the next input weight for testing. However, if it is determined at the decision block 428 that all the input weights have been tested, the routine 400 proceeds to a decision block 430. At the decision block 430 it is determined if all the future output weight combinations have been evaluated. If not, then the routine 400 loops to the block 410 to select the next combination of future outputs. On the other hand, if it is determined at the decision block 430 that all the future output combinations have been tested, then at a block 432 the stable controllers, or combinations of parameters, input weight, and future outputs, are stored in a database. In one presently preferred embodiment, the combinations are sorted in descending order of closeness to 180 degrees out of phase at each mode coupled with the highest modal amplitude wherein the most effective controllers will have a combined control system phase and operational plant phase closest to 180 degrees as well as the highest total amplitudes at each mode, as previously described.

Figure 5:
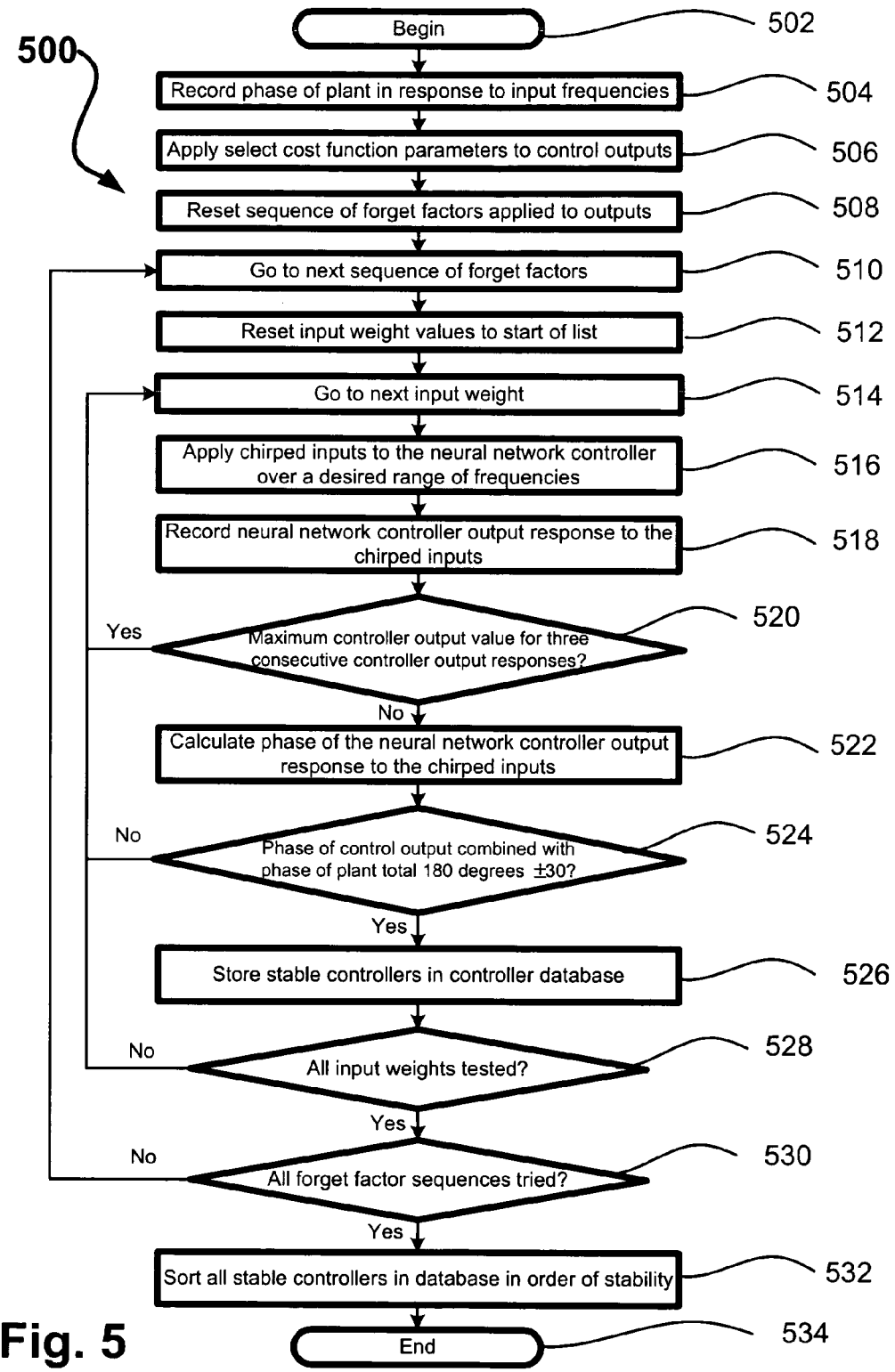
FIG. 5 is a flowchart of a routine according to another embodiment of the present invention.

FIG. 5 shows another routine 500 for employing the system 300 (FIG. 3) to tune the cost function 220 parameters using forget factor looping. As previously described, unlike AB looping, forget factor looping uses all the future outputs generated by the control system instead of just two. Weighting factors are sequentially applied to each of the future outputs. For example, a forget factor base of 0.6 is suitable, with the forget factor raised to each successive power for each iteration of the test. For example, $0.6^1$ may be applied to the first future output, $0.6^2$ (or 0.36) may be applied to the second future output, etc., to weight the future outputs. On a next iteration, the forget factor of 0.5 may be applied to the first future output, $0.5^2$ may be applied to the second future output, etc., to try all the future outputs in a sequential weighting to determine the stability of the cost function parameters and input weights. Forget factor weightings generally range from a high of 5.0 to as small as 0.1.

Using forget factor looping, the cost function in effect is slightly modified and can be written as the expression:

$$C = \sum_{i=1}^{n} \left( G_p \cdot Y_i^2 + G_v \cdot \dot{Y}_i^2 + G_I \cdot I^2 \right) \cdot W^i$$

where C=cost of selected input (I), i through n represent a range of the predicted future states being evaluated, $G_p$=position gain, $Y_i$=predicted state of the plant at horizon i, $\dot{Y}_i$=predicted rate of change of the state of the plant at horizon i, $G_v$=velocity gain, $G_I$=the model input, and W is the forget factor applied to the future output being calculated.

The routine 500 begins at a block 502. At a block 504, in preparation for tuning the cost function 220 parameters, the phase of the operational plant in response to input signals is recorded at each mode as previously described in connection with the AB factor looping routine 400 (FIG. 4). Knowing the phase response of the operational plant at its resonance frequencies (or modes), at a block 506 manually setup the program to choose what and how many controller instantiations to test and compare. The cost function parameters are $G_p$ and $G_v$ and control input weight I. $G_p$ and $G_v$ control the weighting in the cost function placed on minimizing the variance of the position and the velocity, respectively, of the operational plant. $G_p$ and $G_v$ suitably are varied between 0 and 1, thereby testing combinations $G_p$=1 and $G_v$=0, $G_p$=0 and $G_v$=1, and $G_p$=1 and $G_v$=1. By weighting the position and velocity variance of the system, these select parameters affect the phase of the cost function. In addition, the number of input weights to examine is set here.

At a block 508, the sequence of forget factors is reset. Once the sequence of forget factors has been reset at the block 508, at a block 510 the next sequence of forget factors applied to the future outputs is tested. At a block 512, the list of input weights to be applied to the controller system input signals is reset. At a block 514, a next input weight is selected to be applied to the controller system input signals. At a block 516, a series of chirped control inputs is applied to the neural network controllers. The chirped frequencies are the same as applied to the operational plant at the block 504 to gauge the response of the operational plant to those signals. This is because it is the combined characteristics of the control system and the operational plant that will determine the overall response of the operating system to stimuli. At a block 518, responses of the neural network controller are recorded in response to the chirped control inputs applied at the block 516.

At a decision block 520, it is determined whether a maximum control output value results for three consecutive control output responses. The maximum control output value is the highest output of which the controller is capable in attempting to apply a corrective signal to the operational plant. If three maximum values in a row are recorded, it is indicative that the combination of parameters and input weights is not stable and the control system is overcorrecting the operational plant. If three maximum control output values are recorded in a row, the combination of parameters and input weight can be disregarded as unstable. Advantageously, further chirping of the control system may be avoided, thereby saving processing time that could be devoted to testing potentially viable combinations of control system parameters and input weights. If three consecutive control output signals reach the maximum value, then the routine 500 loops to the block 514 to test the next input weight.

On the other hand, if at the decision block 520 the maximum control output value is not recorded for three consecutive control output responses, then at a block 522 the phase of the control outputs is calculated. In one presently preferred embodiment, a FFT is used to calculate the phase, as well as to calculate the phase of the operational plant to the range of known signals applied.

At a decision block 524, it is determined if the phase of the control output combined with the phase of the operational plant for the input signal indicates that the control parameters and input weights tested are stable, as previously described in connection with FIG. 4B. At the block 424 (FIG. 4A) if the combined phase differential between the plant input and plant output and the control input and control output is determined to be unstable, then the parameters and input weight are not considered stable, and the routine 500 loops to the block 514 to try the next input weight. On the other hand, if at the decision block 524 the combined phase differential between the plant input and plant output and the control input and control output is determined to be stable, then at a block 526 the combination of parameters and input weight is stored in a controller database.

At a decision block 528, it is determined if all the input weights have been tested. If not, then the routine 500 loops to the block 514 to go to the next sequence of forget factors for testing. However, if it is determined at the decision block 528 that all the input weights have been tested, then the routine 500 proceeds to a decision block 530. At the decision block 530, it is determined if all of the forget factors and future outputs have been evaluated. If not, then the routine 500 loops to the block 510 to select the next sequence of forget factors to be combined with the future outputs. On the other hand, if it is determined at the decision block 530 that all the combinations of future outputs and forget factor sequences have been tested, then at a block 532 the stable controllers, or combinations of parameters, input weight, and forget factor sequence, are stored in a database. In one presently preferred embodiment, the combinations are sorted in descending order of closeness to 180 degrees out of phase at each mode coupled with the highest modal amplitude wherein the most effective controllers will have a combined control system phase and operational plant phase closest to 180 degrees as well as the highest total amplitudes at each mode, as previously described.

For comparison, for the AB looping routine 400 (FIG. 4), a typical run on a 1GHz Pentium III®-powered computer takes approximately 48 seconds. For forget factor looping according to the routine 500 (FIG. 5), a typical run on the same computer takes approximately 10 seconds. The difference in computation time is explained by the number of combinations tested. As previously described, the AB looping routine 400 may test ($15^2/2$) combinations of future outputs for each of 20 input weights for a total of 2250 combinations being tested for the chirped frequencies. On the other hand, the forget factor looping routine 500 for 20 input weights does not involve so many permutations of combinations of future states as does routine 400. In effect, for each future input for the forget factor looping routine there would be 15 different forget factor numbers for each of 20 different input weights for a total of 300 combinations for each of the chirped frequencies. Running time for such a forget factor loop routine 500 would take approximately 10 seconds.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of designing a predictive control system for a dynamic nonlinear plant, the control including a neural network for predicting a state of the plant and a cost function for generating a cost function response u(n) for the plant, the cost function response u(n) generated from parameters including a predicted state by the neural network, the method comprising:
    sensing responses of the plant to an input signal that operates the plant at different frequencies;
    taking the plant off-line; and
    testing different permutations of cost function parameters to determine a viable permutation for the cost function, wherein testing each permutation includes
        supplying the input signal to the neural network, and
        comparing phases of the cost function responses u(n) to phases of the previously sensed plant responses at corresponding frequencies.

2. The method of claim 1, wherein the cost function parameters selected include position gain and velocity gain.

3. The method of claim 2, wherein the position gain selected includes one of 0 and 1 and the velocity gain selected includes one of 0 and 1.

4. The method of claim 1, wherein combinations of the cost function parameters, the input weight, and the predicted future states are considered stable if the sum of the control system phase differential and operational plant phase differential is either between +150 and +180 degrees or between −150 and −180 degrees, wherein the control system phase differential is the phase differential between a control input and a control output, and wherein the operational plant phase differential is the phase differential between the plant input and the plant output.

5. The method of claim 1, wherein more stable combinations of the cost function parameters, the input weight, and the predicted future states are those for which the sum of the control system phase and the known plant phase is closest to 180 degrees or negative 180 degrees and less stable combinations of the cost function parameters, the input weight, and the predicted future states are those for which the sum of the control system phase and the known plant phase is closest to 0 degrees.

6. The method of claim 1, wherein the input signal is chirped only once for the plant; and wherein the input signal to the neural network is chirped once for each permutation of cost function parameters.

7. The method of claim 6, wherein the chirped input to the plant and the corresponding plant responses are also used to train the neural network.

8. The method of claim 6, wherein the different permutations produce different cost function responses $u(n)$ and wherein the phase of the cost function response $u(n)$ to the chirped input is calculated; and wherein the plant phase is compared to the phases of all of the different cost function responses $u(n)$.

9. The method of claim 1, wherein only permutations at resonant frequencies are tested for stability.

10. The method of claim 1, wherein phase of the plant response and the phase of the cost function response $u(n)$ are in the stable regions shown in FIG. 4B.

11. The method of claim 1, wherein AB looping is used to test different permutations of the cost function parameters.

12. The method of claim 1, wherein forget factor looping is used to test different permutations of the cost function parameters.

13. An article for tuning a cost function of a neural predictive control system for a plant, the system including a neural network for providing a predictive state to the cost function in r the article comprising computer memory encoded with instructions for causing a computer to test different permutations of cost function parameters to determine a viable permutation for the cost function, each permutation resulting in a cost function response $u(n)$, the testing of each permutation including:

supplying a chirped input to the neural network, the chirped input to the neural network corresponding to resonant frequencies of the plant; and accessing recorded responses of the plant to its resonant frequencies; and comparing phases of the cost function response $u(n)$ to phases of the plant response.

14. A system comprising:

a plant; and a predictive control system for the plant, the system comprising at least one processor programmed with a neural network, a cost function for providing a control response to a state provided by the neural network, and code for tuning the cost function, the code causing the at least one processor to record responses of the plant to a chirped input; take the plant off-line; and test different permutations of cost function parameters to determine a viable permutation for the cost function, wherein testing each permutation includes:

supplying a chirped input to the neural network, the chirped input to the neural network being at the same frequencies as the chirped input to the plant, and comparing phases of the cost function response $u(n)$ to phases of the previously measured plant responses.

\* \* \* \* \*

UNITED STATES PATENT AND TRADEMARK OFFICE
CERTIFICATE OF CORRECTION

PATENT NO. : 7,447,664 B2  Page 1 of 1
APPLICATION NO. : 10/653010
DATED : November 4, 2008
INVENTOR(S) : Lawrence E. Pado It is certified that error appears in the above-identified patent and that said Letters Patent is hereby corrected as shown below:

Title Page; item (73); please insert;

The above-captioned application should state the name of the assignee.

Name of Assignee: -- The Boeing Company --
Residence: -- Chicago, IL --

Signed and Sealed this

Third Day of February, 2009

JOHN DOLL
*Acting Director of the United States Patent and Trademark Office*